United States Patent [19]

Trochimowski

[11] 3,963,246

[45] June 15, 1976

[54] TONE ARM FOR RECORD PLAYER

[76] Inventor: Jaroslav George Trochimowski, 100 Gamble Ave., Apt. 910, Toronto, Ontario M4K 2H2, Canada

[22] Filed: May 7, 1975

[21] Appl. No.: 575,473

[52] U.S. Cl. ............................................. 274/23 R
[51] Int. Cl.$^2$ .......................................... G11B 3/38
[58] Field of Search ........................ 274/23 R, 23 A

[56] References Cited
UNITED STATES PATENTS

| | | | |
|---|---|---|---|
| 2,862,716 | 12/1958 | Marks | 274/23 A |
| 2,983,517 | 5/1961 | Klein | 274/23 R |
| 3,005,059 | 10/1961 | Raabe | 274/23 A |
| 3,319,967 | 5/1967 | Zimmermann | 274/23 R |
| 3,380,744 | 4/1968 | Ohnishi et al. | 274/23 R |

*Primary Examiner*—Richard E. Aegerter
*Assistant Examiner*—Steven L. Stephan
*Attorney, Agent, or Firm*—W. Charles Kent

[57] ABSTRACT

An improved tone arm and suspension system therefor for record players. The tone arm is an articulated tone arm comprising a rigid main beam and a head assembly connected thereto at a pivot point. A control means, for moving the head assembly along a curved path such that the path in which the stylus vibrates extends along a radius of the turntable during record play comprises a bearing plate fixed to the head assembly at a predetermined angle and a rigid linkage means spaced beside the main beam. One end of the linkage means is secured at a point spaced from the center post for pivoting in a plane parallel to the turntable. The linkage means is of predetermined length such that its other end slidably contacts the bearing plate to provide proper orientation of the head assembly during record play. Means extending between the linkage means and the main beam, intermediate the ends thereof, co-ordinates pivotal movement of the linkage means with that of the main beam. The tone arm suspension comprises a first gimbal ring associated with the tone arm, the first ring lying in a plane generally parallel to the turntable and secured within a second gimbal ring for pivoting in a plane perpendicular to the turntable. The second ring is pivotally mounted on the top of a vertical center post secured to the chassis of the record player, for rotation in a plane parallel to the turntable. Simple construction, reduced friction during operation and improved tracking of the stylus in a record groove may be achieved by the present invention.

13 Claims, 8 Drawing Figures

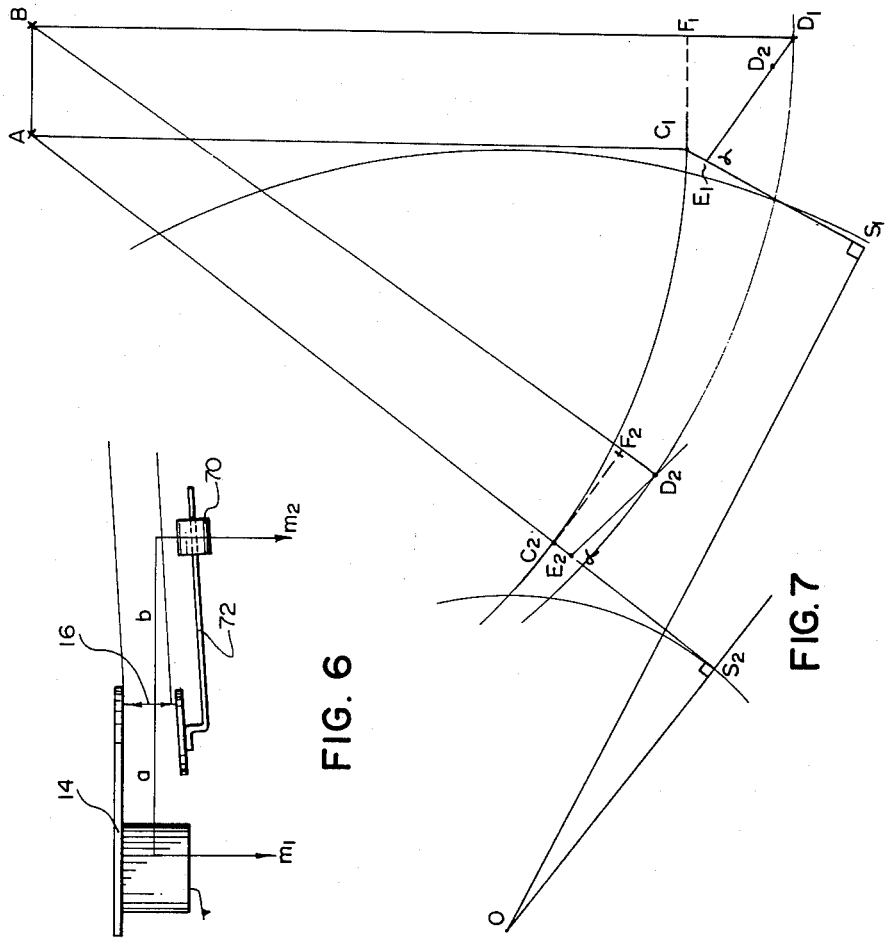
FIG. 7
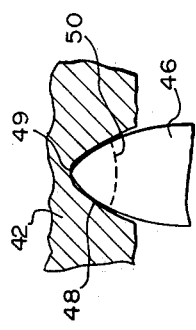
FIG. 6
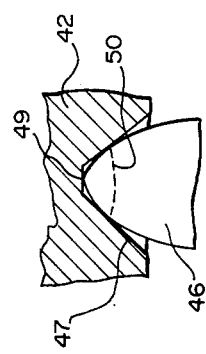
FIG. 5
FIG. 4

TONE ARM FOR RECORD PLAYER

BACKGROUND OF THE INVENTION

This invention relates generally to an improved tone arm for record players, and more particularly concerns an articulated tone arm which permits improved tracking of the stylus in a record groove and which has an improved suspension system, whereby tracking error during record play is reduced to zero, and whereby frictional forces in the arm are greatly reduced.

It is well known that the quality of reproduction of a record is affected by the "tracking error" of the tone arm as the stylus follows the groove of a record. A record groove carries lateral vibrations that should move the stylus back and forth at right angles to the groove. As the groove is a very slight spiral, and thus almost a perfect circle, with its center corresponding with the center of the disc, the stylus should move back and forth along a radius from the record's center. Any deviation from this radial vibration of the stylus is known as tracking error. The result is distortion and unpleasant noise in the reproduced sound, as well as increased record wear.

To reproduce the information recorded on a record, a tone arm is conventionally pivotally mounted at a fixed location upon a chassis adjacent the side of a rotatably mounted turntable. The weight of the tone arm wedges the stylus of a reproducing pick-up assembly into the groove, with the electrical output of the reproducing pick-up being proportional to the lateral displacement of the stylus by the lateral vibration of the groove sides. With such a conventional arrangement, it can be seen that the stylus moves through an arcuate path and thus the vibrations of the stylus are not maintained at right angles to the groove as they should be.

Another problem with conventional tone arms has been skating of the stylus across the record. As a result of the forces exerted on the stylus of such a conventional tone arm during playing of a record, since there is an angle between the line tangent to the groove and the line between the stylus point and the pivot point of the tone arm, there is a component of force directed radially inwardly of the record which tends to pull the stylus towards the center of the record. This radially directed force may cause the stylus to jump over one or more convolutions of the spiral groove in a skating or skipping action.

In order to reduce the tracking error and skating of such conventional tone arms, numerous attempts have been made to ensure that the stylus lies tangentially to a circle centered at the center of the record and thereby vibrates in a radial direction. Suggested solutions can be seen, for example, in U.S. Pat. Nos. 2,522,997 of Coppleman; 2,966,360 of Herve; 3,232,625 of Van Eps; 3,826,505 of Birch; 2,455,529 of Shortt; 2,983,517 of Kline; 3,051,493 of Dreier; 3,502,339 of Tatter et al.; and Canadian Patent No. 582,660 of Burne-Jones. Many of these solutions proposed are cumbersome and expensive to incorporate on a record player. Most of these solutions which suggest articulated tone arms require several pivot points at which frictional forces can be exerted upon the tone arm to reduce its efficiency. These pivot points and sources of friction are necessitated by the very nature of the geometrical solutions to the tracking error and skating problems offered in these prior art solutions.

SUMMARY OF THE INVENTION

According to the present invention, an improved tone arm for a record player is provided, the use of which permits accurate tracking of the stylus in the record grooves and reduced frictional forces interfering with the operation of the tone arm. The tone arm comprises a rigid main beam and head assembly connected thereto at a pivot point which permits the head assembly to pivot in a plane parallel to the turntable. The articulated tone arm is mounted for movement in directions parallel and perpendicular to the turntable on an upright center post secured to the chassis of the record player at one side of the turntable. The head assembly carries a pick-up means which includes a stylus. A control means comprising an elongated linkage means is spaced beside the main beam. One end of the linkage means is pivotally secured to a point spaced from the center post for pivoting the linkage means in a plane parallel to the turntable. The other end is free to slidably co-operate with a bearing plate fixed to the head assembly to move the head assembly along a curved path such that the stylus will at all times vibrate at right angles to the record groove, i.e. along a radial path from the record's center. It can be imagined that the tone arm, linkage means and bearing plate co-operate to form a constrained quadrilateral linkage means, the angles and one side of which (bearing plate side) varying so that the stylus is moved along the proper locus. Means extending between the linkage means and the main beam, intermediate the ends thereof, co-ordinates the pivotal movement of the linkage means with that of the main beam. An extension spring may be attached between the head assembly and main beam of the tone arm to ensure that the bearing plate is maintained in constant contact with the linkage means.

The facts that this system requires only three pivot points and that the linkage means never pulls on the head assembly permit a reduction in frictional forces acting on the system.

Moreover, it will be readily understood that in such prior art tone arm systems as those described by Tatter et al. in U.S. Pat. No. 3,502,339 and Klein in U.S. Pat. No. 2,983,517, the motive power needed to change the stylus angle is derived from stylus friction and thus depends directly on stylus pressure. In the present case, this is so to a much lesser degree in view of the manner in which the linkage means co-operates with the head assembly bearing plate. Thus, the tone arm assembly according to the present invention tracks at very low stylus pressures, while still maintaining proper stylus angle relative to the groove being tracked.

The improved tone arm mounting means comprises a first gimbal ring associated with the tone arm, this first gimbal ring lying in a plane generally parallel to the turntable. This first gimbal ring is secured within a second gimbal ring for pivoting in a plane perpendicular to the turntable. The second gimbal ring is pivotally mounted on the top of the upright center post for rotation in a plane parallel to the turntable. A mass acts with predetermined weight on the second gimbal ring to counter-act the inward, skate-producing forces acting on the tone arm and thereby minimize the skating tendency of the tone arm.

The use of such a gimbal ring suspension for the tone arm permits a further reduction in frictional forces exerted on the tone arm system.

BRIEF DESCRIPTION OF THE DRAWINGS

Other objects and advantages of the invention will become apparent upon reading the following detailed description and upon referring to the drawings, in which:

FIGS. 4 and 5 are partial schematic views of different constructions for suspending the tone arm according to the present invention;

FIG. 6 is a partial elevational schematic view of a further embodiment of a head assembly according to the present invention;

FIG. 7 is a plan view schematic representation of the tone arm system on a record illustrating the geometrical characteristics thereof.

Similar features have been given similar reference numerals in FIGS. 1 to 6. It should be noted that the embodiments and sketches illustrated by the drawings are not necessarily drawn to scale, but instead are merely illustrations intended to reveal features of the invention herein described.

While the invention will be described in connection with specific example embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

Figure 1:
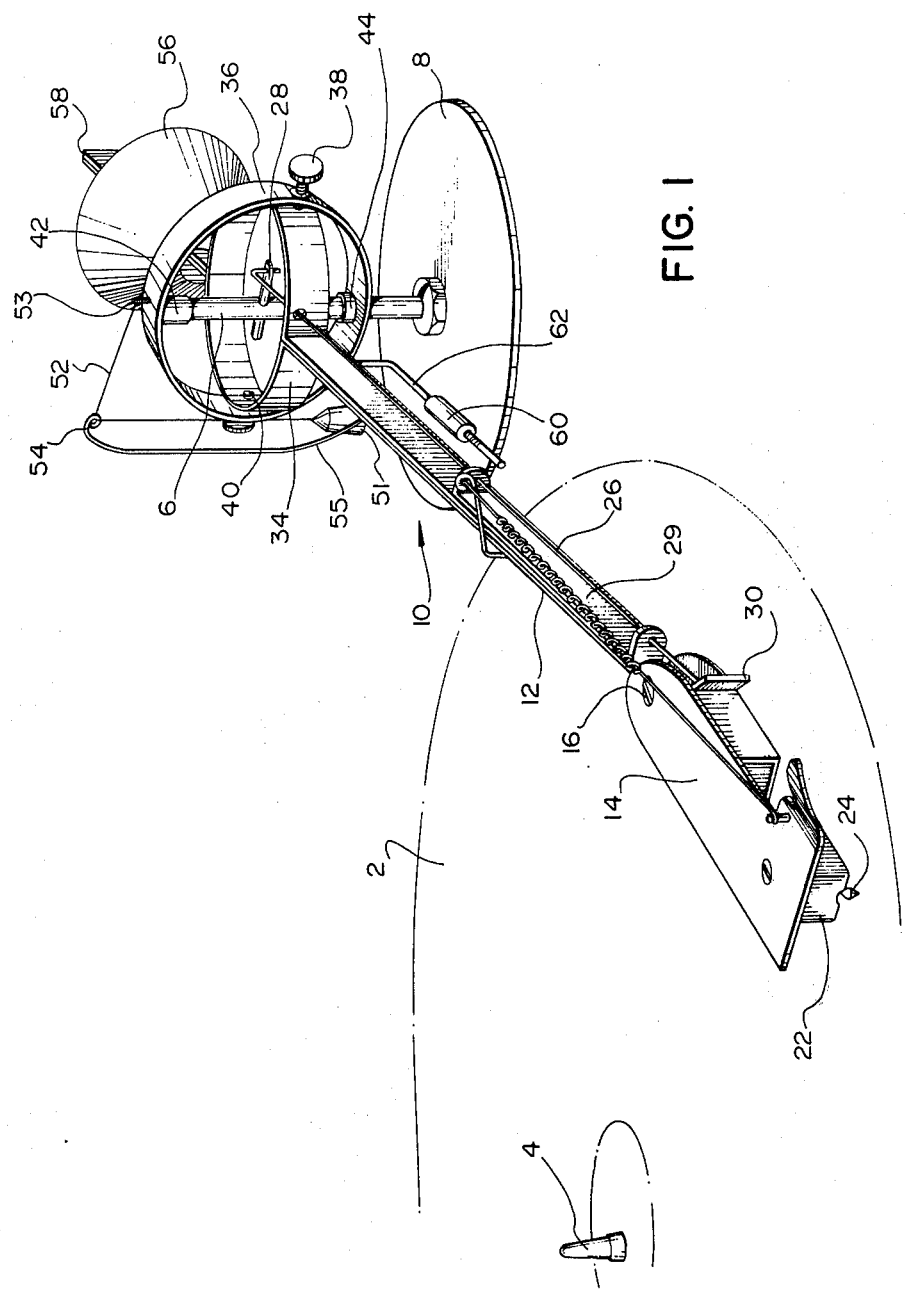
FIG. 1 is a perspective view of a tone arm system according to the invention.
Figure 2:
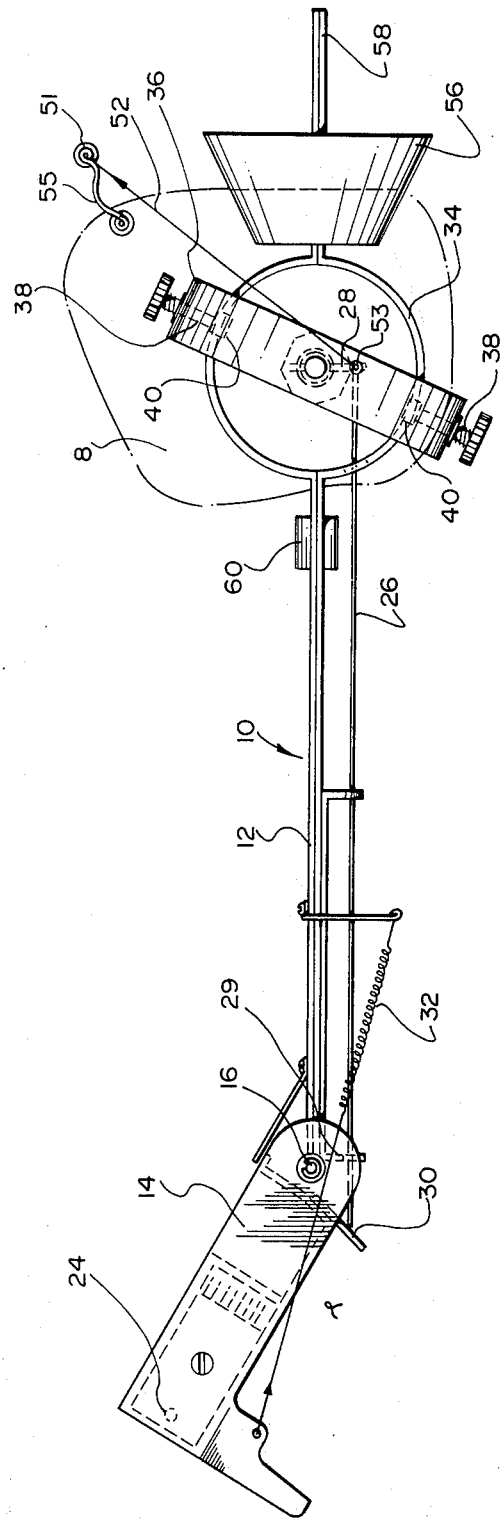
FIG. 2 is a plan view of the tone arm system illustrated in FIG. 1.
Figure 3:
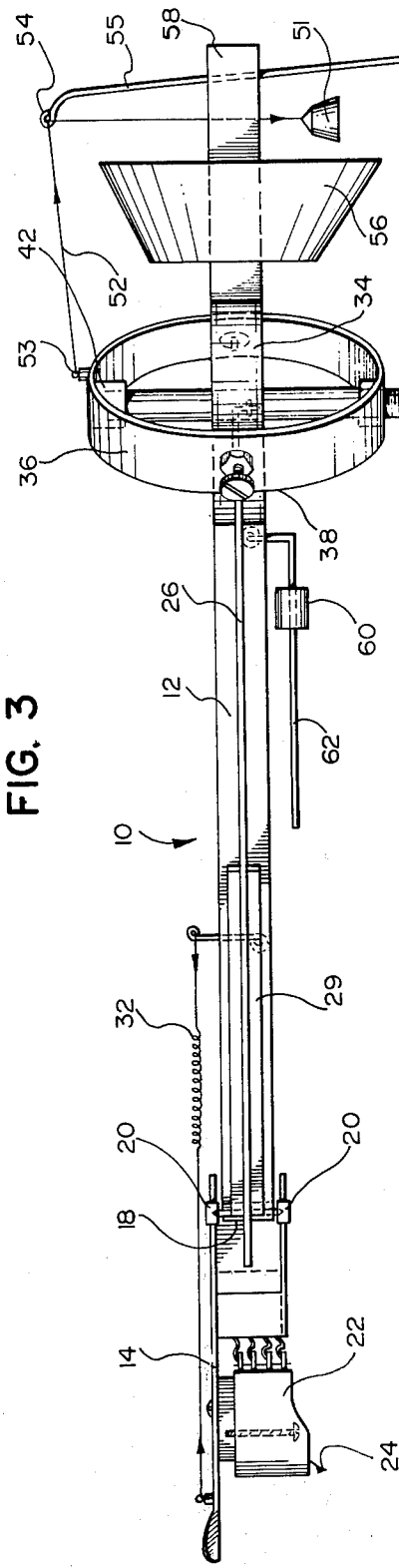
FIG. 3 is an elevational view of the tone arm system of FIG. 1.

Turning first to FIGS. 1, 2 and 3, there is shown a turntable 2 of a record player (in FIG. 1) having spindle 4 at its center. Center post 6 is securely mounted on record player chassis 8 (shown fragmentary in the Figures), and supports tone arm system 10. Tone arm system 10 consists of main beam 12 and head assembly 14 pivotally connected to each other at pivot 16 (seen in FIGS. 1 and 2). As can be seen in FIG. 3, this pivotal connection may be achieved by bearing needle 18 and bearing jewels 20. Head assembly 14 carries pick-up cartridge 22 and stylus 24.

Also part of tone arm system 10 is a linkage means consisting of push rod 26, which is pivotally anchored at one end in peg 28 (which peg is rotatably anchored to center post 6), and which is spaced beside main beam 12. Push rod 26 is consequently free to pivot in planes parallel and perpendicular to the turntable. Support 29, secured to main beam 12 slidably engages push rod 26, and ensures that pivotal movement of main beam 12 is transmitted to and co-ordinated with that of push rod 26. It will be understood that, with this construction of tone arm system, the angle which push rod 26 makes with main beam 12 varies constantly as the system pivots during playing of a record.

In an alternative embodiment, which is not illustrated, but which can be readily understood in light of the embodiment illustrated, means extending between push rod 26 and main beam 12 may consist of a support means pivotally secured to both push rod 26 and main beam 12, instead of a support 29 slidably engaging push rod 26.

The free end of push rod 26 bears against bearing plate 30 under urging from extension spring 32, acting on head assembly 14 and main beam 12. The bearing plate is flat, and made of hard low friction material, such as glass. As will be explained in more detail subsequently, by properly positioning the stylus on head assembly 14, a net counter-clockwise movement of the head assembly about pivot 16 may be achieved. In such a case, the bearing plate will be maintained in contact with the free end of the push rod during playing of a record, so that extension spring 32 might not be required.

Also, as will be explained in more detail subsequently, for a given tone arm system, the proper length of push rod 26 as well as the proper profile of the bearing plate with respect to the line joining the stylus 24 and pivot 16, in the plane of the turntable, may be calculated using geometrical means to ensure no tracking error so that the path in which the stylus is designated to vibrate lies along a radius of the turntable at all times during playing of a record.

Alternatively, the proper bearing plate profile may be determined for a given tone arm system using mechanical means. For example, a suitable small eye hook may be attached to the spindle of the record turntable so that it will not rotate. A long thin rigid weightless wire may be positioned over the stylus, at right angles to the center line of the head assembly. If the arm is tracking without error, then the wire will pass freely through the eye hook during record play. An impression of the exact curve traced by the push rod as it travels along the plate may be obtained by any suitable recording mechanism so that the exact lateral profile or curve of the bearing plate, fitting the particular dimensions of the components of the tone arm system, for zero tracking error, may be obtained.

The tone arm system is supported on center post 6 by means of horizontal gimbal ring 34 and vertical gimbal ring 36 which permit pivotal movement of the tone arm system in planes perpendicular and parallel to the plane of turntable 2. Horizontal gimbal ring 34 as shown is an integral extension of the rear portion of main beam 12, and is fixed for pivotal movement within vertical gimbal ring 36 about an axis through bearing screws 38 threaded through the sides of vertical gimbal ring 36 and gimbal bearings 40 fixed in the sides of horizontal gimbal ring 34. Vertical gimbal ring 36 pivots about an axis through center post 6. Center post jewel bearing 42 fixed to the top of vertical gimbal ring 36 receives the free end of center post 6, and center post bearing 44 secured at the bottom of vertical gimbal ring 36 acts to restrict lateral wobble in the suspension system.

By minimizing the area of contact between the free end of center post 6 and the receiving surfaces of center post bearing 42, horizontal or lateral friction can be minimized. For instance, as shown in the alternative embodiments illustrated in FIGS. 4 and 5, the free end 46 of center post 6 may be ground to a bearing surface curving upwardly to a point, and may be received by a center post bearing 42 having either a frusto-conical interior surface 47 (FIG. 4) or a suitable concave bearing surface 48 (FIG. 5). These surfaces are shaped so that the contact between them occurs only at two locations, first, at point 49, which contact bears the weight of the tone arm system, and along circle 50 which contact acts as a simple bushing sleeve to prevent lateral wobble in the suspension system.

Anti-skate mass 51 is operatively connected to vertical gimbal ring 36 by means of filament 52 which is secured to filament post 53. Filament 52 passes over loop 54 or a pulley on the free end of anti-skate mass support 55. The other end of anti-skate mass support 55 is secured to chassis 8. Filament post 53 is located on vertical gimbal ring 36 at a predetermined position relative to its axis of rotation, and anti-skate mass 51 is of a predetermined weight, so that clockwise forces acting upon the tone arm assembly during playing of a record will be counteracted.

Proper tracking weight of stylus 24 is regulated by adjusting counter-weight 56 movably seated on heel 58 of main beam 12 on the side of horizontal gimbal ring 34 opposite from head assembly 14. Fine adjustment of this tracking weight can be achieved by moving fine adjustment mass 60 along fine adjustment beam 62 on main beam 12 on the head assembly side of horizontal gimbal ring 34.

Turning now to the construction illustrated schematically in FIG. 6, to a head assembly 14 (basically similar to that of the embodiment illustrated in FIG. 1) a center of gravity counter-weight 70, adjustable along head assembly counter-weight beam 72 is added. Beam 72 is secured to a portion of the head assembly. The weight and positioning of head assembly counter-weight 70 with respect to pivot 16 is such that the center of gravity of the head assembly is in this pivot. In this way, stylus pressure remains constant as the tone arm system moves to the record center, even though the head assembly orientation varies with respect to the pivot axis of main beam 12. Otherwise, as in the case of the tone arm assemblies described in U.S. Pat. Nos. 3,502,339 of Tatter et al., and 2,455,529 of Shortt, as well as in the case of the assembly of FIG. 1 herein, the effective lever arm of the tone arm assembly would be increased as the pick-up means moves toward the center of the record, consequently increasing tracking force or stylus pressure.

It will be understood that, as main beam 12 pivots clockwise about center post 6 during playing of a record, push rod 26 is pivoted similarly in a clockwise direction. Since one end of push rod 26 is anchored in peg 28, spaced from center post 6, the relative sliding motion of push rod 26 through support 29 is in the general direction of the center post, so that the free end of push rod 26 withdraws, relative to bearing plate 30, causing head assembly 14 to pivot in a counter-clockwise direction.

In the alternative embodiment described previously, where the movement of the main beam is transmitted to and coordinated with that of the push rod by means of support means pivotally secured to both the main beam and the tone arm (instead of being secured to the main beam and slidably engaging the push rod), where the main beam and push rod are secured together in parallel relationship, this parallel relationship will be maintained at all times during pivoting of the tone arm system while a record is being played.

Geometrical-Mechanical Analysis

From FIG. 7, which is a schematic representation of the tone arm assembly of FIGS. 1 to 3 at two positions on a record centered on the turntable, the manner of selecting the orientation of the bearing plate with respect to the head assembly, as well as the manner in which the tone arm system operates to ensure that the stylus vibrates in a radial direction with respect to the record's center may be readily understood. In this Figure, the center of the record is coincident with the spindle of the record player, and has been designated as the letter 0. The main beam of the tone arm has been designated AC, A representing the point about which the main beam pivots in the plane parallel to the turntable and record. The head assembly is represented by SC, C representing the point on the main beam about which the head assembly pivots parallel to the turntable and record and S representing the stylus. The linkage means is represented by BD, B being the pivot point of the anchored end of the linkage means, and D representing the free end thereof which is in contact with the bearing plate. CF represents co-ordinating means extending between the tone arm and the linkage means, fixedly attached to the main beam at C and slidably engaging the linkage means at F.

For these given conditions, it is desired to calculate the angle at which the bearing plate must lie in relation to line CS so that the stylus S will vibrate at all times during playing of the record in a radial direction. Since distances AB, AC, BD and CS are fixed, as are the distance CF and the angle ACF, their respective positions can be determined precisely for various positions of the stylus on the record, i.e. so that the angle OSC is ninety degrees at each position. When the tone arm system is at the first and second positions, as illustrated in FIG. 7 ($AC_1$ $S_1$, etc. denoting the first position and $AC_2$ $S_2$, etc. denoting the second), the points at which D lies will trace out the locus of points lying on the bearing plate for this particular set of parameters. By transposing the locus traced out by the point D for a number of positions of the tone arm system, onto one position, e.g. the first position in FIG. 7, this locus can be readily traced by joining these points D. In this way, the angle $S_1$ $E_1$ $D_1$ (i.e. the angle which the bearing plate will make with the line extending between the stylus and the pivot point of the head assembly, so that the stylus will vibrate radially for all positions of the tone arm assembly during playing of a record) can be established. This locus, being the lateral profile required for bearing plate 30 for these particular conditions, may be approximated by a straight line.

Figure 8:
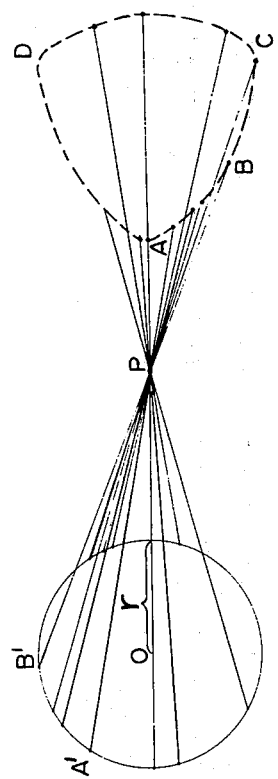
FIG. 8 is a geometrical representation of a method of approximating the shape of the bearing plate for given dimensions of tone arm components. (Figure on third page of drawings).

Upon investigation by varying the dimensions of main beam length, head assembly length, push rod or linking means length, push-rod to main beam separation, and spindle to center post length, this profile of the bearing plate was found to be approximated by a portion of the curve which is obtained by plotting the points of a circle through a fixed point by means of a fixed distance, as shown in FIG. 8. It has been found that the dimensions of the various components of the tone arm assembly can be chosen so that this bearing plate profile can be made to closely approximate a straight line, the actual curvature of which is negligible for practical considerations. For instance, as shown in FIG. 8, when the points of the circle having center 0 and radius $r$ are plotted by means of a fixed distance through point P, their locus appears as a smooth triangular curve for the conditions represented. (This locus may approach an elongated "air foil" shape as the ratio $OP:r$ approaches infinity for such fixed distance. For the purposes of the approximation illustrated in FIG. 8, the push rod BD is the fixed distance, the distance AB of the push rod from center post A is $r$, and the distance AC from the center post to the push rod support along the main beam is the distance OP. The constant distance is imagined to act through arc A'B' in generating the arc AB of curve ABCD. This arc approaches a straight line as the distance of the circle from point P increases and the distance from point P to the projected figure decreases. Consequently, it can be understood that the bearing plate lateral profile can be made to approach a straight line by suitable variation of the tone arm system component dimensions.

The dimensions of the components should be such that the sum of the length of the main beam and head assembly is less than the distance between the record player spindle and the center post. Where the spindle to center post distance is about 150 mm., then the sum of the length of the main beam and head assembly should be about 0.7 plus or minus 0.3 mm. The length of the main beam and head assembly should be selected such that the angle ACS does not exceed 180° as the tone arm system moves towards the center of a record.

Since the orientation of the bearing plate varies with the length of the linkage means BD, this length should be such that the angle the linkage means makes with the bearing plate is always greater than the limiting angle of static friction coefficient of the linkage means sliding on the bearing plate.

Since the record grooves do not correspond exactly to concentric circles, but instead approximate a long, tight, logarithmic spiral, the angle OSC should be slightly less than 90°. Two ways to accomplish this are:

1. By slightly rotating AB counter-clockwise about A so that push rod or linkage means BD slides in, away from the head assembly, a minute distance from its position for the 90° angle adjustment. Stereo readout may be checked electronically to locate the proper position for AB and the linkage means.

2. By placing a thin tape or similar spacing means on the bearing plate, adjusting the system for OSC being 90° and then removing the tape.

From the previous description it is clear that as the arm moves towards the record center, linkage means BD slides through point F beside the arm, plate ED adhering to end B which slides across it. In this way, the head assembly rotates counter-clockwise about pivot point C, and angle SCA is opened while right angle OSC is maintained.

Thus it can be seen that the geometry of the tone arm system is an improvement upon known quadrilateral solutions as it incorporates lower friction with greater degrees of freedom in following the required 90° relationship of the stylus to the groove.

Force Considerations

When the tone arm system as illustrated in FIGS. 1 to 3 is in operation, several forces act on the system:

1. an accelerating force acting on the tone arm in a clockwise direction, increasing as the system moves clockwise, due to the curvature of the groove;

2. a friction force moment acting in the clockwise direction tending to remain constant as the system moves clockwise. Where the head assembly pivot point is the center of mass of the head assembly as in FIG. 6, however, this moment decreases in this clockwise direction;

3. the gravity force of the anti-skate mass acting in an anti-clockwise manner on the assembly;

4. the spring tension of spring 32, acting through bearing plate and linkage means to urge the tone arm system in a clockwise direction.

Forces 1 and 2 can be measured and calculated, and are not adjustable. However, Forces 3 and 4 are adjustable, and for a given tone arm system, would be adjusted so that $1 + 2 + 4 = 3$ throughout record play. For example, the tension of spring 32 can be adjusted so that it, together with the frictional forces of the head assembly, linkage means and horizontal tone arm balance the force of the anti-skate mass. Thus the anti-skate mass will not tend to move the tone arm system counter-clockwise and also will present an inertia to sudden changes in the tone arm system travel rate.

Although the playing motion of the system slightly raises this mass as the arm moves toward the center of the record, the anti-skate mass can be considered as a body at rest with respect to the motions of the arm since its own motion is negligibly small.

Where no anti-skate device is used, then the spring tension is simply adjusted for minimum tension necessary for maintaining the bearing plate in contact with the end of the linkage means at the end of play position of the tone arm system.

Where a tone arm with a head assembly according to the embodiment of FIGS. 1 to 3 is used, then the retarding friction force moment about the pivot is effectively a constant for all practical purposes. However, when a head assembly with a counter-weight according to FIG. 6 is used, in which constant stylus pressure is achieved throughout the playing of a record, this moment is decreased as the supplementary angle to SCA (FIG. 7) is decreased.

Where maximum reproduction fidelity is desired, spring 32 may be omitted from the tone arm system. By moving the stylus with respect to the line passing through head assembly pivot 16 (point C in FIG. 7), a net counter-clockwise moment may be produced in the head assembly about this pivot. This moment, if properly chosen by adjusting the distance between the stylus and the head assembly pivot for a given stylus pressure, can be utilized in holding the head assembly via the bearing plate in contact with the linkage means. The orientation of the bearing plate and/or the length of the linkage means has to be adjusted for such a case.

When no such spring is used in the tone arm system, and the head assembly is balanced so that its center of gravity is at pivot point 16, the stylus pressure remains constant during the entire playing of a record in spite of elongation of the arm as the tone arm system approaches the center of the record resulting in even, minimal record wear for low tracking weights.

This "no-spring" tone arm system is useful for a system having a permanent and fixed tracking weight. It is both sensitive and reliable. The head assembly, however, is free to flap when not in playing position, making it cumbersome in manual operation and difficult to adapt to automatic players.

For tone arm systems accommodating various types of pick-ups (cartridges), a spring 32 would normally be used, since the spring tension is independent of stylus pressure and allows for quick, simple stylus pressure adjustment. If the head assembly is not equipped with a center of gravity counter-weight as in FIG. 6, the tension of the spring can be made to act in such a way as to impart a continuously constant moment clockwise on the arm through the linkage means, the sum of all clockwise moments being nearly constant. This net constant clockwise moment can be balanced by a suitable anti-skate mass suspended as illustrated. Further adjustment of the system may be achieved by variation of spring tension and the line of action of the spring. Where the head assembly is not equipped with a center of gravity adjustable counter-weight, there will be increased stylus pressure near the center of the record, with consequent increased record wear there.

In a tone arm system wherein, instead of a support 29 slidably engaging push rod 26, the means coordinating the pivotal movement of the push rod with that of the main beam is a support means pivotally connected to both the main beam and the push rod, the clockwise moment due to the action of extension spring 32 is diminished. Thus, rigidity of head action can be obtained by use of a tighter spring so that the arm becomes more suitable for use with automatic record players. The tone arm system of this embodiment can be constructed of very light materials and thus, even though extra pivots are needed over the embodiment illustrated in FIGS. 1 to 3, the movement of the relatively massive cartridge and head assembly is not dependent upon motive power obtained from arm motion as been the case in known tone arm systems. The coordinating means can be pivoted to the main beam at a distance away from the head pivot to permit easier construction. The lateral profile of the push plate, when a tone arm according to this alternative embodiment is constructed, is easily obtained according to methods previously discussed herein.

From experimental observation, it has been found that the tone arm system according to the present invention will track at very low stylus pressure (and with constant pressures where the center of gravity counter-weight of FIG. 6 is used), while not exhibiting a tendency to skate either while playing or while stationary. With all forces properly balanced, at zero stylus pressure, the arm responds to a perpendicular impulse by moving in a damped to stand-still motion. It does not skate in either direction and does not oscillate. Under ¼ to 2 gm. tracking weight, the arm delivers remarkably symmetric left-right readout. In addition, it has been found that this arm will "play through" sections of worn records where other arms get "stuck in a rut" and repeat a groove over and over. Moreover, this design is extremely versatile, lending itself to several modifications based on considerations of either maximum fidelity or minimum record wear combined with simplicity of construction and operation.

Because of the simple design of the tone arm system, a very minimal material use is necessary, and such tone arm system may be made very light, sensitive and accurate with little cost.

Thus it is apparent that there has been provided in accordance with the invention a tone arm and tone arm suspension system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly it is intended to embrace all such alternatives, modifications and variations as fall within the spirit and broad scope of the appended claims.

What I claim is:

1. In a record player comprising: a chassis; a turntable mounted for rotation relative to said chassis and adapted to carry a record having a spiral groove; a spindle extending upwardly centrally of said turntable; an articulated tone arm comprising a rigid main beam and a head assembly connected thereto at a pivot point for pivoting in a plane parallel to the turntable; an upright center post secured to the chassis at one side of said turntable; means mounting said tone arm on said center post for movement of said tone arm in a plane perpendicular to the turntable about a first axis perpendicular to the center post and in a plane parallel to the turntable about a second axis through said center post; pick-up means including a stylus, said pick-up means being carried by said head assembly with said stylus to track the spiral groove of a record on the turntable; and control means for moving said head assembly along a curved path such that the path in which the stylus vibrates extends along a radius of said turntable, the improvement wherein said control means comprises a bearing plate fixed to said head assembly at a predetermined angle and a rigid linkage means spaced beside said main beam, one end of said linkage means secured at a point spaced from said center post for pivoting in a plane parallel to the turntable, said linkage means being of predetermined length such that its other end slidably contacts said bearing plate to provide proper orientation of the head assembly during record play, and means extending between said linkage means and said main beam, intermediate the ends thereof, to co-ordinate pivotal movement of said linkage means with that of said main beam.

2. A record player according to claim 1 wherein said linkage means comprises a push rod parallel to and spaced beside main beam.

3. A record player according to claim 2 wherein the bearing plate is positioned such that the angle the bearing plate makes with the push rod is greater than the limiting angle of static friction coefficient of the end of the push rod sliding on the bearing plate for all positions of the push rod during playing of a record.

4. A record player according to claim 1 wherein said means co-ordinating pivotal movement of the linkage means and the main beam is fixed to said main beam and slidably engages said linkage means.

5. A record player according to claim 1 wherein said control means further comprises biasing means extending between the head assembly and the main beam to maintain the bearing plate in contact with the linkage means.

6. A record player according to claim 5 wherein said biasing means comprises an extension spring, one end of which is attached to the head assembly and the other end of which is attached to the main beam, the line of action of said spring being positioned, and the tension of said spring being such that, the bearing plate is maintained in constant contact with said linkage means.

7. A record player according to claim 5 wherein a counter-weight is secured to said head assembly, the center of gravity of the head assembly and counter-weight falling on the pivot point, whereby the stylus pressure is maintained constant during playing of a record.

8. A record player according to claim 1 wherein a counter-weight is secured to said head assembly, the center of gravity of the head assembly and counter-weight falling on the pivot point, whereby the stylus pressure is maintained constant during playing of a record.

9. In a record player comprising: a chassis, a turntable mounted for rotation relative to said chassis and adapted to carry a record having a spiral groove; a spindle extending vertically centrally of said turntable; a tone arm; an upright center post secured to the chassis at one side of said turntable; means mounting said tone arm on said center post for movement of said tone arm in a plane perpendicular to the turntable about a first axis perpendicular to and intersecting the center post and in a plane parallel to the turntable about a second axis through said center post; pick-up means including a stylus being carried by said tone arm, the improvement wherein said means mounting said tone arm comprises a first gimbal ring associated with the tone arm, said first ring lying in a plane generally parallel to the turntable and secured within a second gimbal ring for pivoting about said first axis, said second ring pivotally mounted at its upper inner surface on the top of said vertical center post for rotation about said second axis.

10. A record player according to claim 9 further comprising a mass which acts with constant predetermined weight on said second gimbal ring to counteract the inward, skate-producing forces acting on the tone arm.

11. A record player according to claim 10 wherein said mass is connected near the pivot point of said second ring and hangs freely by means of a non-stretching filament which extends from said pivot point connection over a loop or pulley spaced laterally from said connection, to said anti-skate mass.

12. A record player according to claim 10 wherein said tone arm is an articulated tone arm comprising a rigid main beam and a head assembly connected thereto at a pivot point for pivoting in a plane parallel to the turntable, and said pick-up means being carried by said head assembly with said stylus adapted to track the spiral groove of the record on the turntable and having control means for moving said head assembly along a curved path such that the path in which the stylus vibrates and extends along a radius of said turntable, said control means comprising a bearing plate fixed to said head assembly at a predetermined angle and a rigid linkage means spaced beside said main beam, one end of said linkage means secured at a point spaced from said center post for pivoting in a plane parallel to the turntable, said linkage means being of predetermined length such that its other end slidably contacts said bearing plate to provide proper orientation of the head assembly during record play, and means extending between said linkage means and said main beam, intermediate the ends thereof, to co-ordinate pivotal movement of said linkage means with that of said main beam.

13. In a record player comprising: a chassis, a turntable mounted for rotation relative to said chassis and adapted to carry a record having a spiral groove; a spindle extending upwardly centrally of said turntable; an articulated tone arm comprising a rigid main beam and a head assembly connected thereto at a pivot point for pivoting in a plane parallel to the turntable; an upright center post secured to the chassis at one side of said turntable; means mounting said tone arm on said center post for movement of said tone arm in a plane perpendicular to the turntable about a first axis perpendicular to and intersecting said center post, said means comprising a first gimbal ring associated with the main beam, said first gimbal ring lying in a plane generally parallel to the turntable and secured within a second gimbal ring for pivoting about said first axis, said second ring pivotally mounted on the top of said vertical center post for rotation about said second axis in a plane parallel to the turntable; pick-up means including a stylus, said pick-up means being carried by said head assembly with its stylus adapted to track the spiral groove of a record on the turntable along a curved path such that the path in which the stylus vibrates extends along the radius of said turntable, said control means comprising a bearing plate fixed to said head assembly at a predetermined angle and a rigid linkage means spaced beside said main beam, one end of said linkage means secured at a point spaced from said center post for pivoting in a plane parallel to the turntable, said linkage means being of predetermined length such that its other end slidably contacts said bearing plate to provide proper orientation of the head assembly during record play, and means extending between said linkage means and said main beam, intermediate the ends thereof to co-ordinate pivotal movement of said linkage means with that of said main beam.

* * * * *